(12) United States Patent
Dickhut et al.

(10) Patent No.: US 6,358,034 B1
(45) Date of Patent: Mar. 19, 2002

(54) MOLDING MACHINE WITH MOLD BLOCK CARRIAGE

(75) Inventors: Heinrich B. Dickhut, Charleston; John S. Berns, Cleveland, both of TN (US)

(73) Assignee: Cullom Machine Tool & Die, Inc., Cleveland, TN (US)

( * ) Notice: Subject to any disclaimer, the term of this patent is extended or adjusted under 35 U.S.C. 154(b) by 0 days.

(21) Appl. No.: 09/697,099

(22) Filed: Oct. 26, 2000

Related U.S. Application Data

(62) Division of application No. 09/259,735, filed on Mar. 1, 1999, now Pat. No. 6,193,496.

(51) Int. Cl.$^7$ ............................................. B29C 47/90
(52) U.S. Cl. .................. 425/233; 425/326.1; 425/336; 425/370; 425/392; 425/396; 425/453
(58) Field of Search ............................. 425/233, 326.1, 425/336, 370, 371, 388, 392, 396, 453

(56) References Cited

U.S. PATENT DOCUMENTS

| | | | |
|---|---|---|---|
| 2,866,230 A | 12/1958 | Holte | |
| 4,319,872 A | 3/1982 | Lupke et al. | 425/532 |
| 4,504,206 A | 3/1985 | Lupke et al. | 425/326.1 |
| B14,439,130 A | 10/1985 | Dickhut et al. | 425/388 |
| 4,681,526 A | 7/1987 | Lupke | 425/532 |
| 4,718,844 A | 1/1988 | Dickhut et al. | 425/522 |
| 5,489,201 A | 2/1996 | Berns et al. | 425/233 |
| 5,531,583 A | 7/1996 | Berns et al. | 425/193 |
| 5,545,369 A | * 8/1996 | Lupke | 425/233 |

* cited by examiner

Primary Examiner—Nam Nguyen
Assistant Examiner—Joseph Leyson
(74) Attorney, Agent, or Firm—Wood, Phillips, VanSanten, Clark & Mortimer

(57) ABSTRACT

A molding machine including a plurality of carriages for carrying mold blocks in an axial direction. The carriages each include wheels on opposite sides which follow a guide track along an endless path including a molding section extending in the axial direction. Two wings are secured to the carriages for pivoting about an axis extending in the axial direction whereby in one pivotal position the mold blocks are together in a molding position and in another pivotal position the mold blocks are separated in a releasing position. Each of the wings is adapted to carry one of the mold blocks and has a flat axially extending surface and guide wheels. A wing guide track engages the wing guide wheels and is adapted to place the wings in the molding position when the carriage is in the molding section. A first set of track rollers along the molding section engages the flat axially extending surface of one of the wings of carriages in the molding section along a first rolling plane extending in the axial direction. A second set of track rollers along the molding section engages the flat axially extending surface of the other of the wings of carriages in the molding section along a second rolling plane extending in the axial direction.

4 Claims, 6 Drawing Sheets

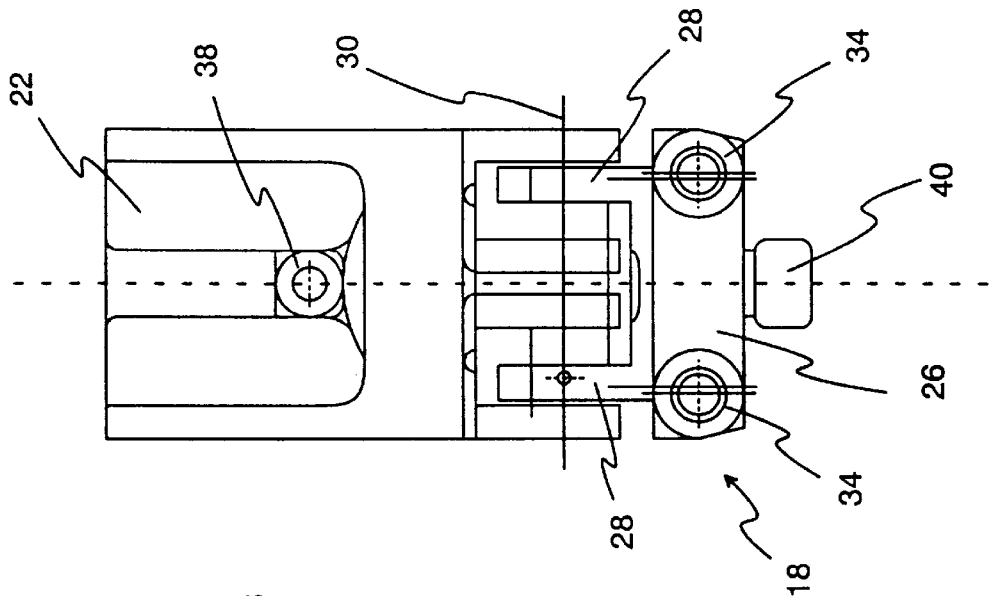
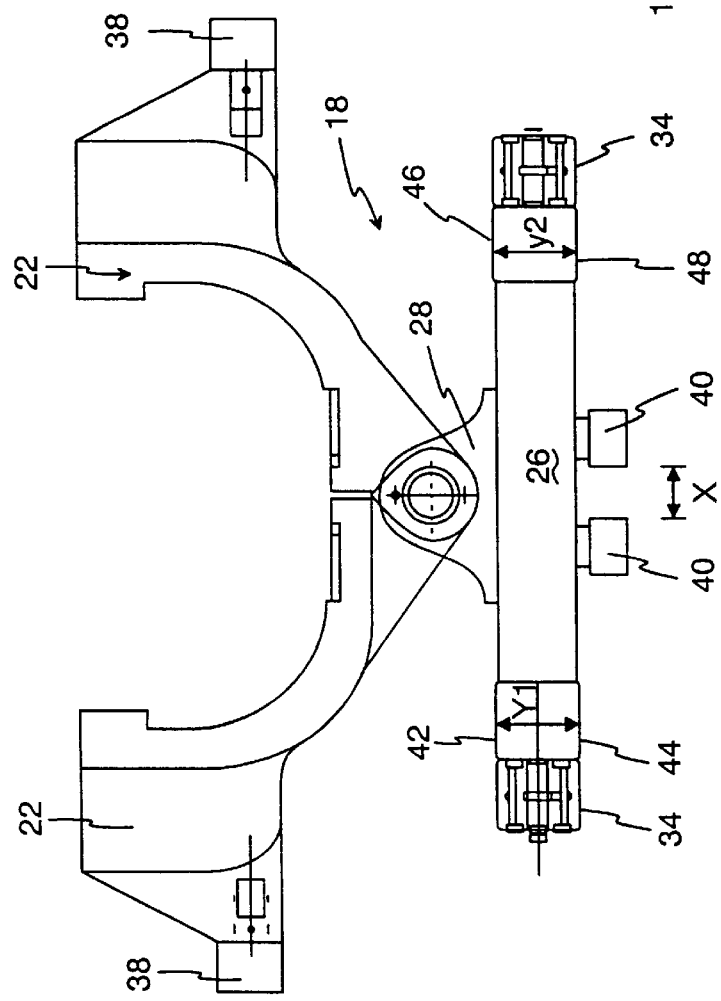

MOLDING MACHINE WITH MOLD BLOCK CARRIAGE

RELATED APPLICATION

This is a divisional application of U.S. Ser. No. 09/259,735, filed Mar. 1, 1999, now U.S. Pat. No. 6,193,496.

BACKGROUND OF THE INVENTION

1. Technical Field

The present invention is directed toward machines for molding objects, and more particularly toward carriages for use in positioning the mold blocks in such machines.

2. Background Art

A well known method for manufacturing corrugated pipes is to extrude a tube of thermoplastic from a head and then conform that tube to the interior of a corrugated mold tunnel formed by mold blocks. The mold blocks typically come in pairs and mate together to form a portion of the mold tunnel, and the thermoplastic is either blown into its shape (by pressure created within the mold tunnel) or by vacuum (where vacuum draws the air from around the mold tunnel).

Structures which have been used in the vacuum method of manufacture are illustrated in U.S. Pat. Nos. 4,318,872, 4,439,130, and 4,718,844. These patents all address the problem of drawing a uniform, strong vacuum around the entirety of the mold blocks which are continually moving during the molding process.

Moving and properly aligning multiple mold blocks is important to ensure that the formed product is continuously uniform along its length without distortions which could occur if the mold blocks are not properly aligned relative to each other. In clamshell type machines, for example (with the mold blocks supported on a single carriage on one side), any forces incurred on the other side of the mold blocks naturally involves a larger moment arm about the carriages, with the result being that such structures can be more susceptible to "sawtooth" type arrangements through the mold tunnel, with successive mold blocks being tilted slightly rather than perfectly aligned with the axis of the mold tunnel.

In order to properly align the mold blocks, it has been found to be advantageous to carry the mold blocks on carriers which themselves have wheels which ride in a track about the path desired for the mold blocks. In order to secure the carriages in the track, the wheels must generally be trapped by opposite sides of the track. In such cases, clearance must be provided (i.e., the opposite track sides must be spaced apart a distance which is greater than the wheel diameters) to allow the wheels to roll on one side without dragging on the other. Such clearance can, however, result in some looseness of the carriage, thereby allowing some degree of sawtoothing. One structure which has been used to address this is shown in U.S. Pat. No. 5,489,201, in which an extra roller is provided along the sides of the carriages, such extra wheel being offset from the other carriage wheels so that it will roll along the top of the machine track while the other carriage wheels roll along the bottom of the machine track.

Rollers have also been provided on carriages and similarly guided in tracks to secure the carriages against lateral shifting during motion. U.S. Pat. No. 4,439,130 shows such a structure. The clearance which must be provided with those rollers (again to prevent the wheel from dragging on one side of the track while rolling on the other side) does, however, potentially allow some degree of undesirable lateral shifting of the carriage and carried mold blocks.

The present invention is directed toward overcoming one or more of the problems set forth above.

SUMMARY OF THE INVENTION

In one aspect of the present invention, a molding machine is provided including a plurality of carriages for carrying mold blocks in an axial direction. The carriages each include wheels on opposite sides which follow a guide track along an endless path including a molding section extending in the axial direction. Two wings are secured to the carriages for pivoting about an axis extending in the axial direction whereby in one pivotal position the mold blocks are together in a molding position and in another pivotal position the mold blocks are separated in a releasing position. Each of the wings is adapted to carry one of the mold blocks and has a flat axially extending surface and guide wheels. A wing guide track engages the wing guide wheels and is adapted to place the wings in the molding position when the carriage is in the molding section. A first set of track rollers along the molding section engages the flat axially extending surface of one of the wings of carriages in the molding section along a first rolling plane extending in the axial direction. A second set of track rollers along the molding section engages the flat axially extending surface of the other of the wings of carriages in the molding section along a second rolling plane extending in the axial direction.

It is an object of the present invention to provide a molding machine which may be reliably operated.

It is also an object of the present invention to provide a corrugator for making plastic tubing which may be reliably operated.

It is another object of the present invention to provide a corrugator which will reliably operate to make tubing of various diameters, including large diameter tubing.

It is still another object of the present invention to provide a corrugator which will operate as above at minimum cost.

Another object of the present invention is to provide a corrugator which may be operated at relatively high speeds over long periods of time without degrading the quality of the produced tubing.

BRIEF DESCRIPTION OF THE DRAWINGS

FIG. 2 is an end view of a carriage and pivoting wings;

FIG. 3 is a side view of the carriage of FIG. 2;

DESCRIPTION OF THE PREFERRED EMBODIMENT

Figure 1:
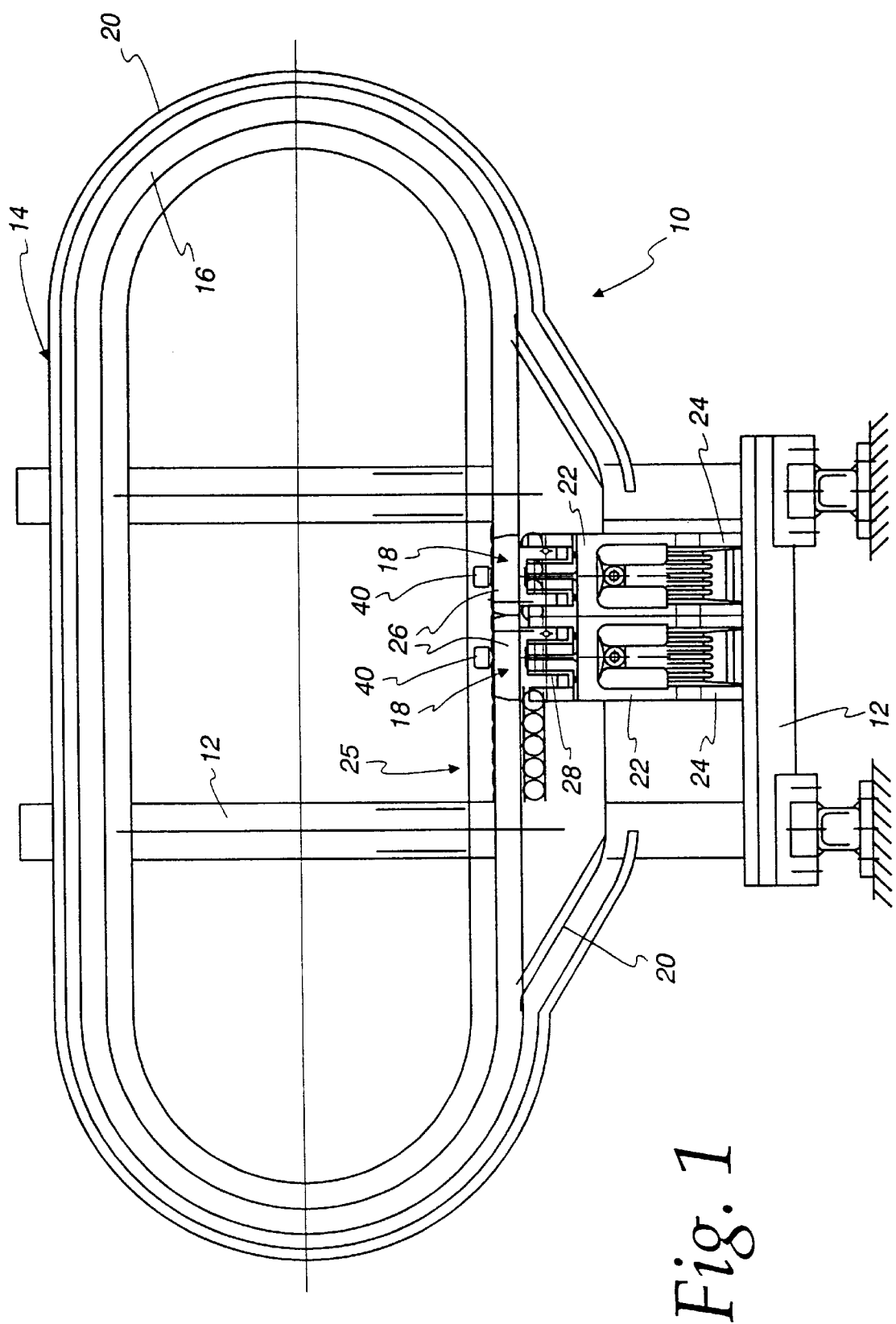
FIG. 1 is a side view of a molding machine track and showing two carriages.

A molding machine 10 embodying the present invention is generally shown in FIG. 1, including a support frame 12 and an endless trackway 14. As described hereafter and as is generally known in the art (see U.S. Pat. No. 4,439,130, the complete disclosure of which is hereby incorporated by reference), the trackway 14 includes one track or guide channel 16 for guiding carriages 18 about the trackway 14 and a second track 20 for controlling the position of the pivotable wings 22 and supported mold blocks 24 as they move about the trackway 14. In a preferred embodiment, the carriages 18 are disconnected from one another and are pushed around the trackway 14 by one or more drive mechanisms (not shown), although it would also be within the scope of the present invention to connect the carriages 18 to one another (e.g., by a chain or similar structure) and then drive the connected structure (e.g., by a chain drive).

It should be appreciated that the present invention relates specifically to improved control and positioning of the mold blocks, particularly in the molding section 25 portion of the trackway 14. (In the machine 10 illustrated in FIG. 1, the molding section 25 is the substantially linear portion along the bottom of the trackway 14. If the machine 10 is being used to make corrugated tubes, for example, the mold blocks 24 along the molding section 25 are closed and abutted against one another to form a straight corrugated tunnel therein, with the molded material such as extruded plastic being formed to the mold faces of the mold blocks 24, either by a vacuum drawing the material against the faces or pressure blowing the material against the faces, or a combination of both.) The present invention could thus be used with many different features available for molding machines which will not be described herein. Therefore, only general descriptions of such other features are described herein and/or illustrated in the Figures, with some such other features not described herein. For example, no extruder is shown in FIGS. 1–8, but it should be understood that such an element would commonly be used to provide plastic material for molding.

Further, it should be appreciated that the present invention could be used where the mold blocks are substantially continuously moving during molding no matter the type of object being molded, although this invention has particular efficacy in molding continuous tubes, and therefore the description herein is directed toward such use of the invention.

Referring now to FIGS. 2–3, the carriages 18 include a substantially flat base 26 with ears 28 extending therefrom to define a pivot axis 30 extending substantially longitudinally to the direction of travel of the carriages 18. Two guide wheels 34 are provided on opposite sides of the base 26 (suitably secured for pivoting as by bearings such as indicated in FIG. 2), which guide wheels 24 are disposed in the track 16 to guide the carriages 18 about the elongated oval trackway 14. In most cases, two such guide wheels 34 on each side of the base 26 would be suitable, although it would be in the scope of the present invention to have more or even fewer such guide wheels 24.

Figure 4:
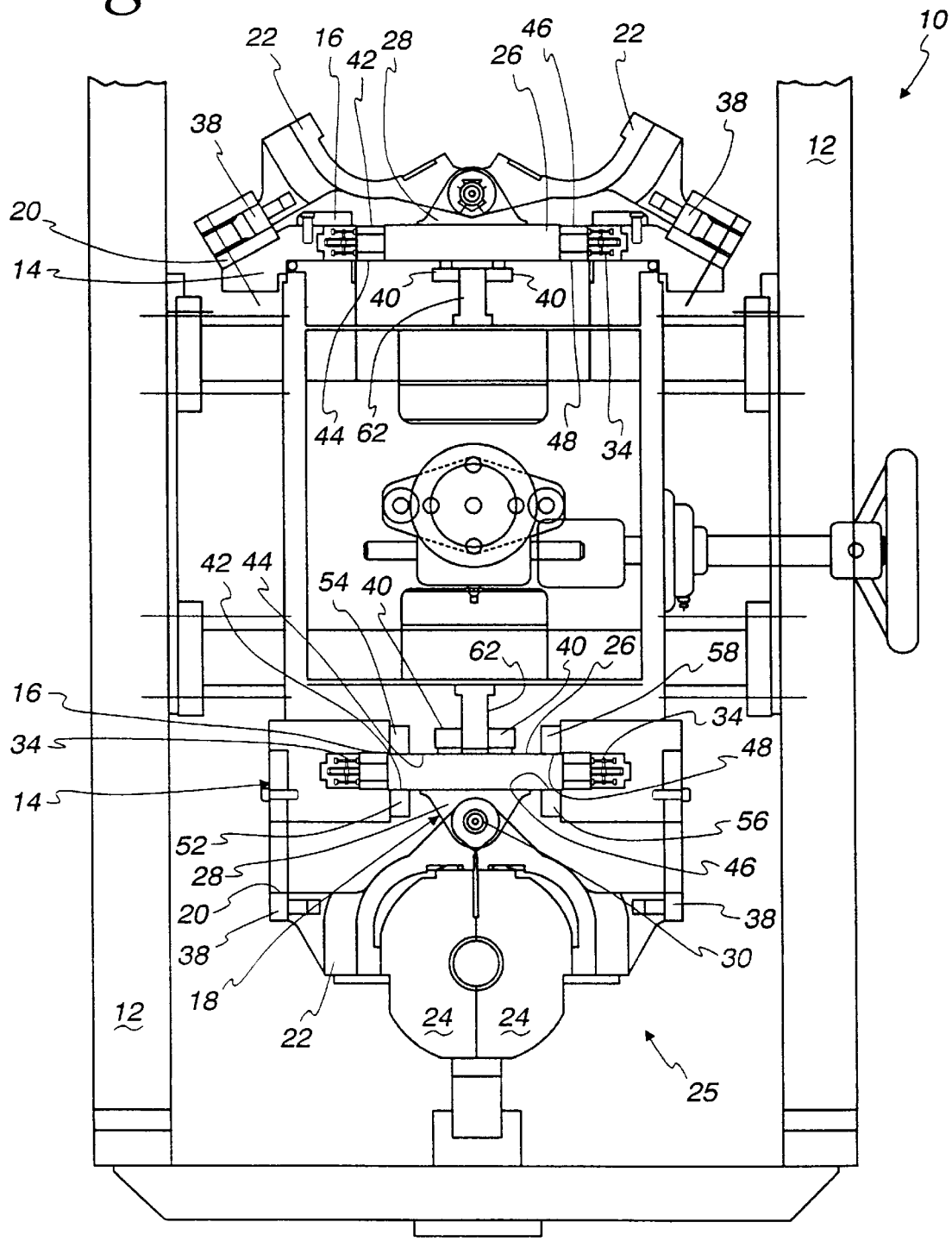
FIG. 4 is a cross-sectional view of the molding machine illustrating a carriage and mold blocks in the molding section and in the return section.
Figure 5:
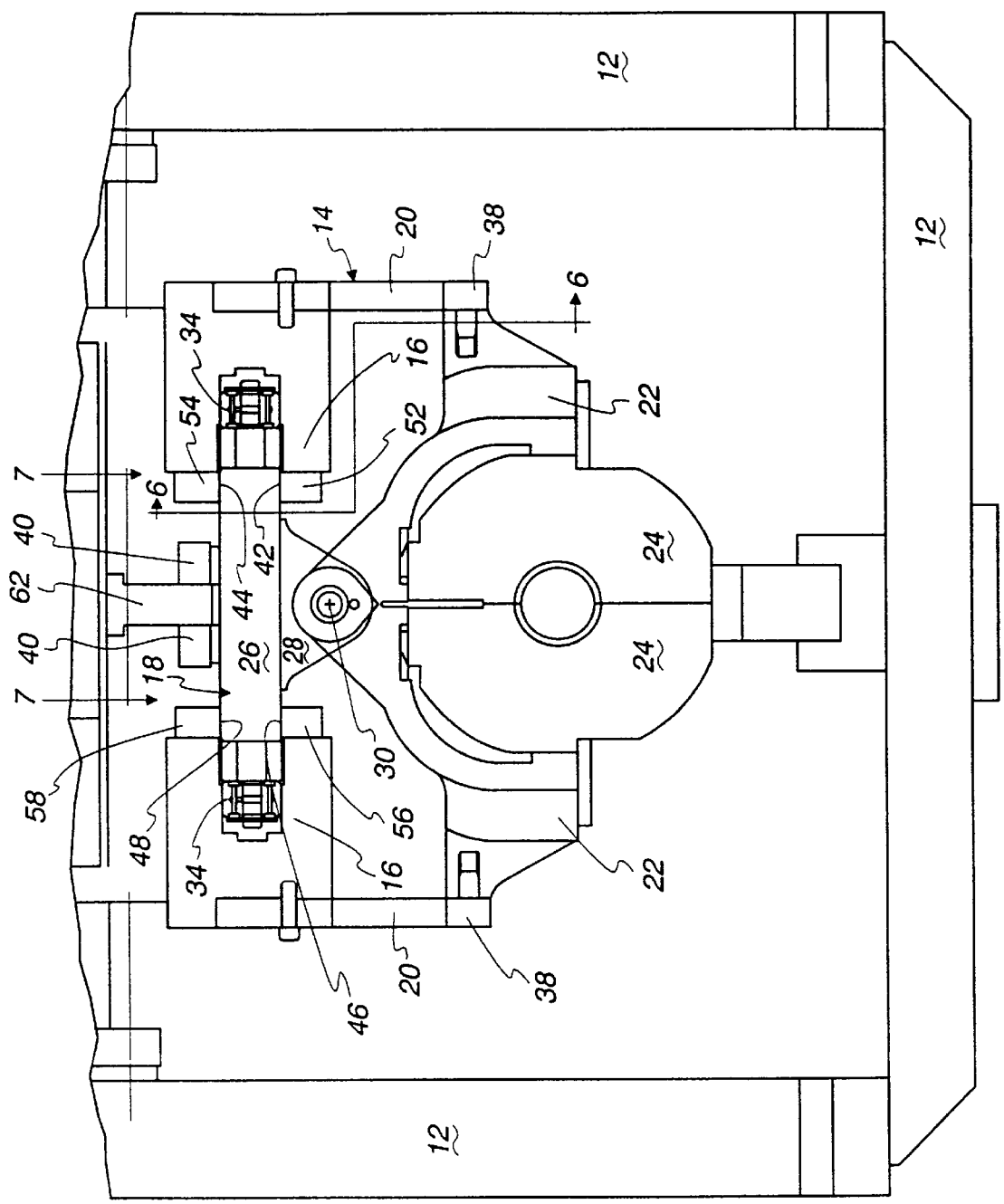
FIG. 5 is a view similar to FIG. 4 showing the molding section.
Figure 6:
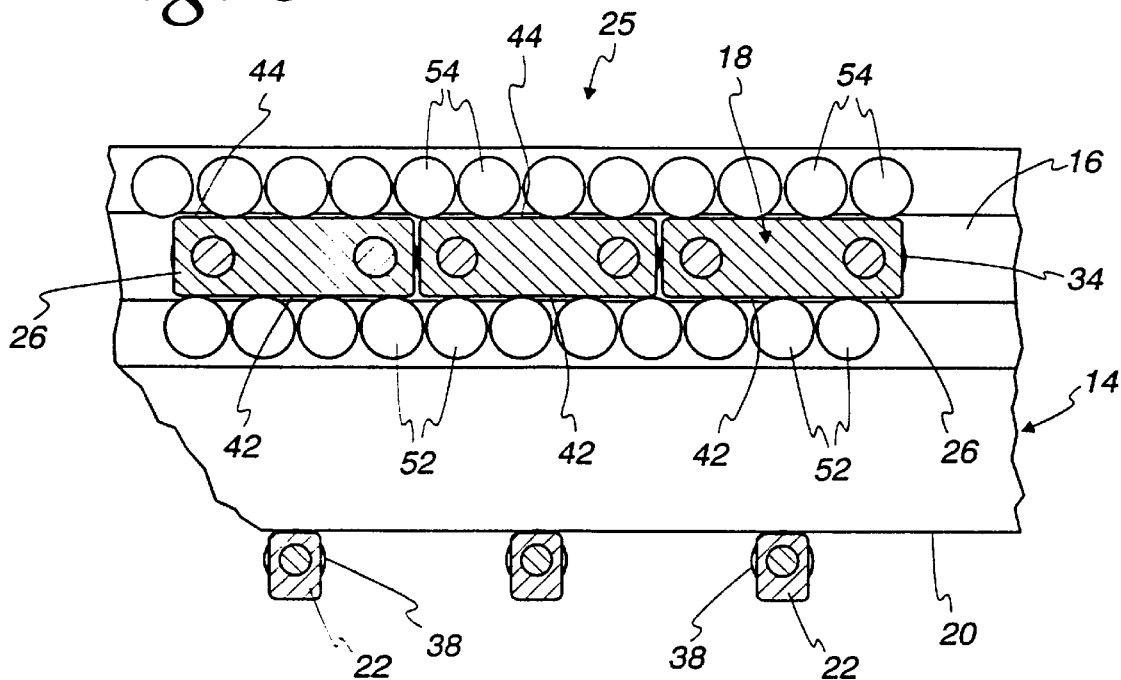
FIG. 6 is a cross-sectional view taken along line 6—6 of FIG. 4.
Figure 7:
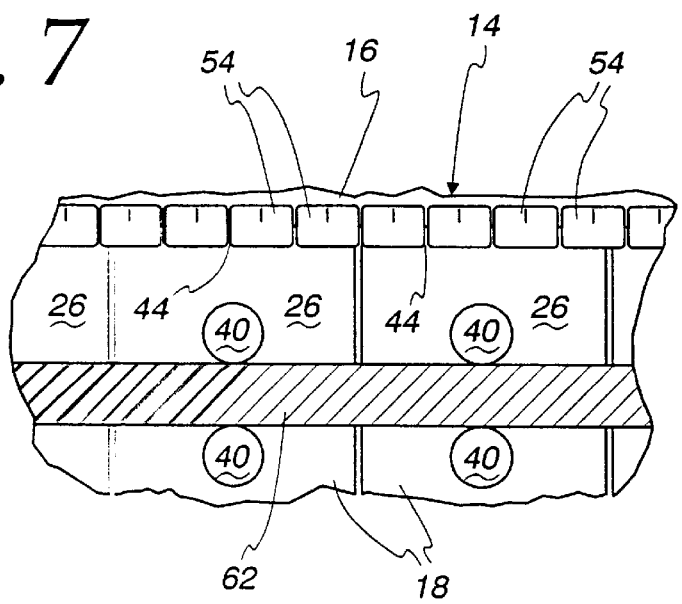
FIG. 7 is a cross-sectional view taken along line 7—7 of FIG. 4.

A pair of wings 22 are suitably secured to the ears 28 for pivoting about the pivot axis 30. The wings 22 are adapted to carry mold blocks 24 (not shown in FIGS. 2–3), with different mold blocks 24 being selectively attachable for molding of different products and/or different sizes of products. Each of the wings 22 also includes at least one guide wheel 38 which engages the second track 20 to control the pivotal position of the wings 22 (and attached mold blocks 24) as they move about the trackway 14. Specifically, as shown in FIG. 4, the mold blocks 24 are closed to form a molding tunnel for a continuous tube (at the bottom of FIG. 4) along the molding section 25 of the trackway 14, and are opened (at the top of FIG. 4) on the return run, typically to enhance cooling as the mold blocks 24 are returned to the beginning of the molding section 25. Of course, as is known in the art, and as can be seen from the orientation of the second track 20 in FIG. 1, the mold blocks 24 need to be closed over the continuous stream of material being molded at the beginning of the molding section 25 and need to be opened clear of the molded material at the end of the molding section 25 to release the molded product.

In accordance with the present invention, the carriage base 26 also includes centering rollers 40 secured for pivoting about axes which are substantially perpendicular to the direction of travel of the carriages 18, which rollers 40 are spaced apart with their facing rolling surfaces spaced apart a selected distance X (see FIG. 2). The carriage base 26 also includes, on opposite lateral sides of the base 26, sets of oppositely facing and axially extending flat surfaces 42, 44 and 46, 48. The thickness of the base 26 at these surfaces (i.e., the spacing of the surfaces from one another) is also a selected distance $Y_1$ and $Y_2$ (which are preferably, but do not necessarily need to be, equal to one another).

Referring now particularly to FIGS. 4–7, the molding machine 10 also includes along the molding section 25 of the trackway 14 four different sets of track rollers 52, 54, 56, 58, two sets 52, 54 and 56, 58 being associated with one another on opposite sides whereby the roller sets 52, 54 and 56, 58 define facing rolling planes which are spaced apart selected distances substantially equal to the selected distances $Y_1$ and $Y_2$, whereby roller sets 52, 54 will engage base flat surfaces 42, 44 and roller sets 56, 58 will rollingly engage base flat surfaces 46, 48 as the carriages 18 move along the molding section 25. It should be appreciated that with this advantageous structure, greater stability is provided to the carriages 18 during molding to ensure proper alignment of the attached mold blocks 24, without sawtoothing which can occur if the carriages 18 tip forward or back even a little amount along their axial dimension. Moreover, it should be appreciated that the roller sets 52, 54 and 56, 58 of the present invention do not have to provide any clearance, so that the spacing between their rolling planes can be the selected distances $Y_1$ and $Y_2$ (as contrasted with the carriage guide wheels 34 which must have a diameter slightly less than the track or channel 16 to avoid rubbing on the non-rolling side of the wheel). This elimination of required spacing significantly improves the stability of the carriages 18.

A central guide track 62 is also included is also provided around the trackway 14, and extends generally outwardly from the inside of the trackway 1 4 toward the carriages 18 so as to be received between the centering rollers 40. The central guide track 62 has a lateral dimension which is substantially equal to X. Thus, it should be appreciated that there need not be any clearance provided between the central guide track 62 and the centering rollers 40, so that exact lateral positioning of the carriages 18 may also be maintained to ensure precise alignment of adjacent mold blocks 24 along the molding section 25. In that regard, it should be noted that although the central guide track 62 may be provided around the entire trackway 14, such track 62 is of particular importance along the molding section 25. Accordingly, in those aspects of the present invention in which this central guide track 62 is used, it should be understood that such track 62 could be narrowed outside of the molding section 25 (where precise positioning of the carriages 18 is not so important) to allow some spacing from the centering rollers 40 (or such track 62 could even be eliminated altogether).

It should thus now be appreciated that the present invention will allow the carriages 18 and attached mold blocks 24 to be very precisely aligned and oriented along the molding section 25 where molding is occurring. Therefore, the degradation of the molded products made by the machine 10 which can result with misalignment of adjacent mold blocks 24 may be effectively eliminated. Such advantages can be obtained with all size mold blocks 24, although it will be appreciated by those skilled in the art that such advantages will be particularly advantageous over the prior art with larger mold blocks 24 (e.g., mold blocks 24 for making corrugated tubes of 30 inch diameter or larger).

Figure 8:
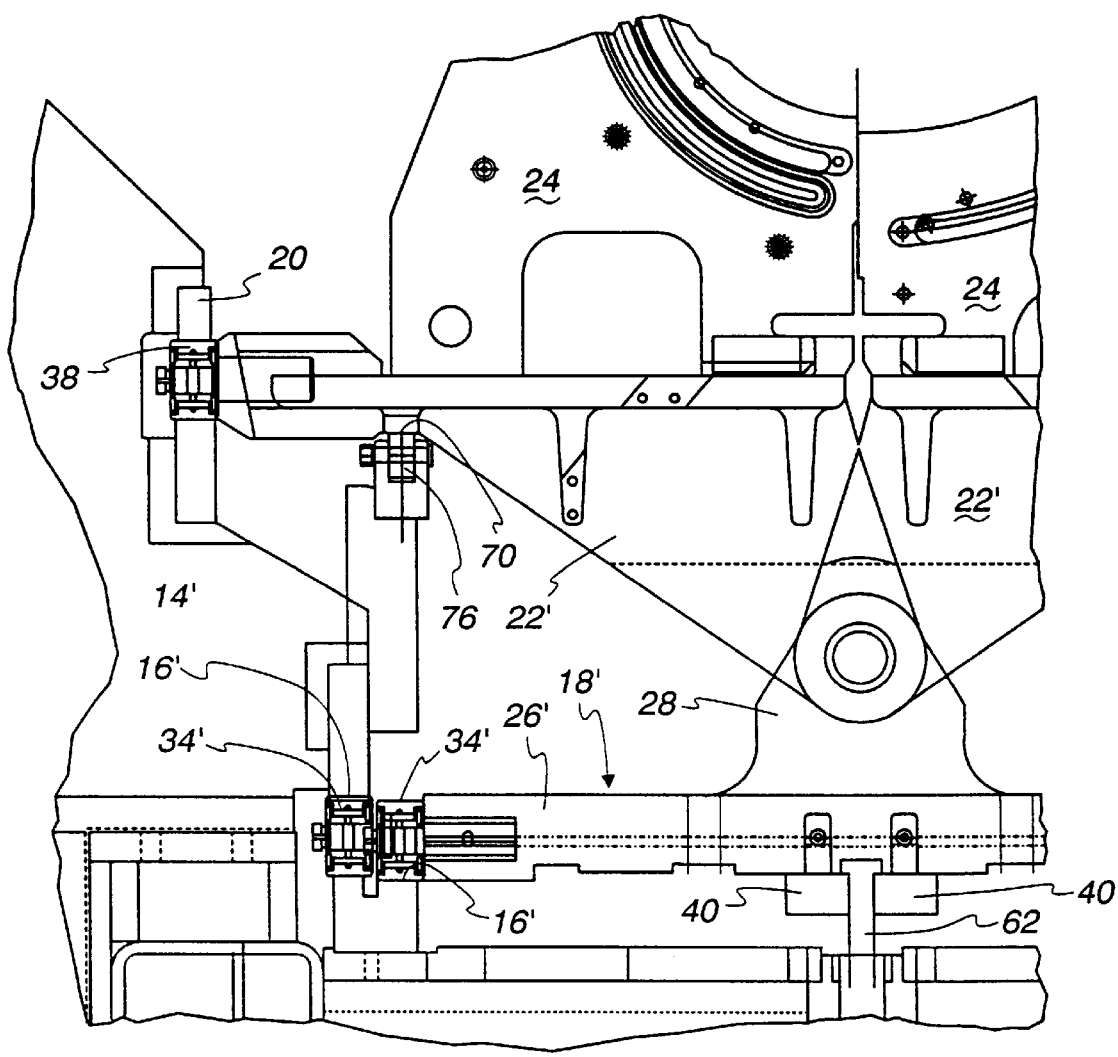
FIG. 8 is a detailed cross-sectional view of the embodiment of the present invention which is the subject of this application.

An alternative embodiment providing improved alignment of mold blocks 24 along the molding section 25 is illustrated in FIG. 8. (In the description of this embodiment, components which are the same as with the above described embodiment are identified by the same reference numerals, and components which are similar but modified are identified with the same reference numerals plus prime ("'")

With this alternative embodiment, the wings 22' are provided with axially extending flat surfaces 70 (only one wing 22' is shown in FIG. 8) and the track 14' is modified to include a set of track rollers 76 along the molding section 25, which track rollers 76 define a axially extending rolling plane so as to cause the wing flat surfaces 70 to align with the rolling plane and thereby assist in aligning the carriage wings 22' and attached mold blocks 24 with one another along the molding section 25.

As illustrated in FIG. 8, the carriage 18' may be provided with laterally spaced guide wheels 34' on each side of the base 26', with laterally spaced and oppositely facing tracks 16' engaging opposite sides of the guide wheels 34'. These guide wheels 34' can thus provide support in both vertical directions (for a horizontal molding section 25) also without requiring spacing on the opposite, non-rolling side of the wheels 34' since no track surface is required on that opposite side. It would also be within the broad scope of the present invention to laterally align (and longitudinally space) guide wheels so long as the rolling surface of each set of wheels were spaced outwardly of the non-rolling surface of the other set of wheels (thereby ensuring that the track surface associated with each set of wheels would be spaced outwardly from the non-rolling surface of the other set of wheels). Still further, it would be within the scope of the present invention to use the additional track wing rollers 76 and wing flat surfaces 70 in the FIGS. 1–7 embodiment (i.e., to replace the extra set of guide wheels 34' in the FIG. 8 embodiment with the track roller sets 52, 54 and 56, 58 of the FIGS. 1–7 embodiment).

As with the previously described embodiment, it should now be appreciated that this embodiment thus also assists in eliminating product degradation which could occur if the mold blocks 24 were misaligned during molding.

Still other aspects, objects, and advantages of the present invention can be obtained from a study of the specification, the drawings, and the appended claims. It should be understood, however, that the present invention could be used in alternate forms where less than all of the objects and advantages of the present invention and preferred embodiment as described above would be obtained.

We claim:

1. A molding machine, comprising:
   a plurality of carriages for carrying mold blocks in an axial direction, said carriages each including wheels on opposite sides of said carriage;
   two wings secured to said carriages for pivoting about an axis extending in said axial direction whereby in one pivotal position the mold blocks are together in a molding position and in another pivotal position the mold blocks are separated in a releasing position, each of said wings adapted to carry one of the mold blocks and having a flat axially extending surface;
   a guide wheel on each of said wings;
   a carriage guide track for said carriage wheels for guiding said carriages about an endless path including a molding section extending in the axial direction;
   a wing guide track engaging said wing guide wheels and adapted to place said wings in said molding position when said carriage is in said molding section;
   a first set of track rollers along said molding section, said first set of track rollers engaging said flat axially extending surface of one of said wings of carriages in said molding section along a first rolling plane extending in said axial direction; and
   a second set of track rollers along said molding section, said second set of track rollers engaging said flat axially extending surface of the other of said wings of carriages in said molding section along a second rolling plane extending in said axial direction.

2. The molding machine of claim 1, wherein:
   said flat, axially extending surface on said one of said wings is laterally spaced relative to said axial direction from said guide wheel on said one of said wings when said carriage is disposed in said molding section; and
   said flat, axially extending surface on said other of said wings is laterally spaced relative to said axial direction from said guide wheel on said other of said wings when said carriage is disposed in said molding section.

3. The molding machine of claim 1, wherein said flat, axially extending surfaces on said wings and said wing guide track are substantially parallel to one another when said carriage is disposed in said molding section.

4. The molding machine of claim 1, wherein said flat, axially extending surfaces on said wings are substantially co-planar when said carriage is disposed in said molding section.

* * * * *